(12) United States Patent
Yokoi

(10) Patent No.: US 6,807,302 B2
(45) Date of Patent: Oct. 19, 2004

(54) RECOGNITION APPARATUS AND RECOGNITION METHOD

(75) Inventor: Kentaro Yokoi, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 652 days.

(21) Appl. No.: 09/805,178

(22) Filed: Mar. 14, 2001

(65) Prior Publication Data

US 2001/0022854 A1 Sep. 20, 2001

(30) Foreign Application Priority Data

Mar. 14, 2000 (JP) ........................................ 2000-071140

(51) Int. Cl.⁷ ................................................ G06K 9/48
(52) U.S. Cl. ........................ 382/199; 209/584; 209/900; 250/559.36; 356/240.1; 356/613; 382/101; 382/164; 382/165; 382/224
(58) Field of Search ........................ 382/101, 163–165, 382/199, 224, 300; 209/584, 900; 250/559.36; 356/613, 240.1

(56) References Cited

U.S. PATENT DOCUMENTS

| | | | | |
|---|---|---|---|---|
| 5,153,443 A | * | 10/1992 | Nishijima et al. | 250/559.36 |
| 5,431,288 A | * | 7/1995 | Nishijima et al. | 209/584 |
| 5,617,481 A | * | 4/1997 | Nakamura | 382/101 |
| 6,023,526 A | * | 2/2000 | Kondo et al. | 382/165 |
| 6,035,058 A | * | 3/2000 | Savakis et al. | 382/163 |
| 6,157,749 A | * | 12/2000 | Miyake | 382/300 |
| 6,291,785 B1 | * | 9/2001 | Koga et al. | 209/584 |
| 6,421,451 B1 | * | 7/2002 | Shiratsuchi et al. | 382/101 |

FOREIGN PATENT DOCUMENTS

| | | |
|---|---|---|
| JP | 8-147405 | 6/1996 |
| JP | 9-61113 | 3/1997 |
| JP | 11-153411 | 6/1999 |

* cited by examiner

Primary Examiner—Bhavesh M. Mehta
Assistant Examiner—Gregory Desire
(74) Attorney, Agent, or Firm—Pillsbury Winthrop LLP

(57) ABSTRACT

A recognition apparatus of this invention for recognizing sorting information as a character string written within a cellophane region of a paper-like material extracts edge components according to a differential image based on an image of light and shade of the paper-like material, determines a cellophane frame based on the edge components and recognizes the character string within the thus determined cellophane frame as an address. Thus, the cellophane region in which the address used as the sorting information is written can be correctly extracted and occurrence of erroneous recognition of the sorting information and erroneous sorting of the paper-like material can be prevented.

17 Claims, 14 Drawing Sheets

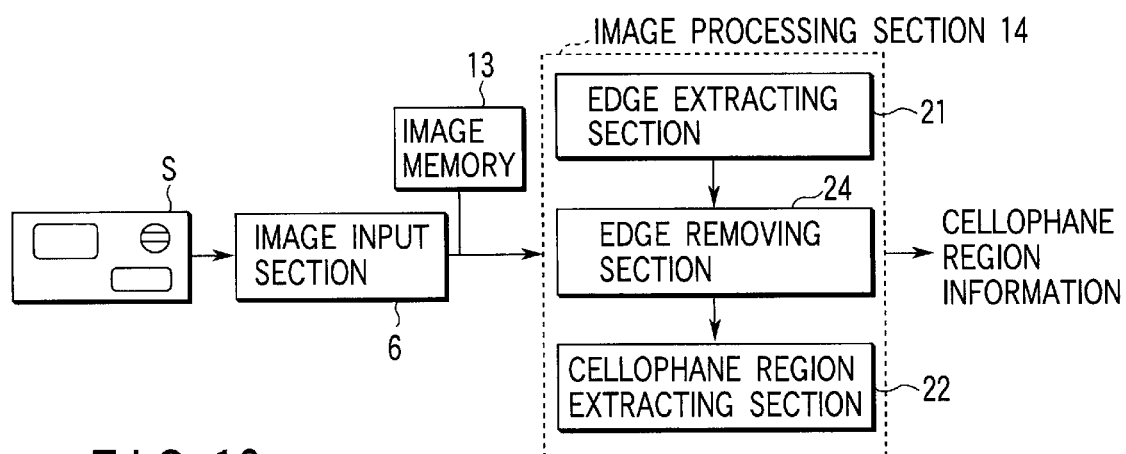
FIG. 10
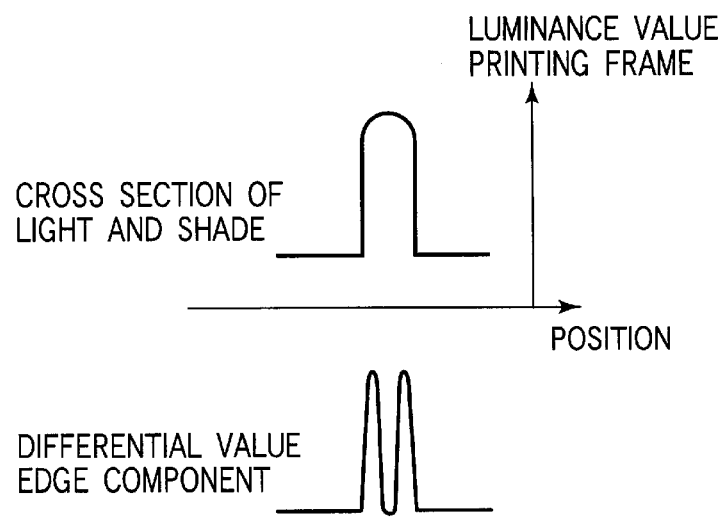
FIG. 11A
FIG. 11B

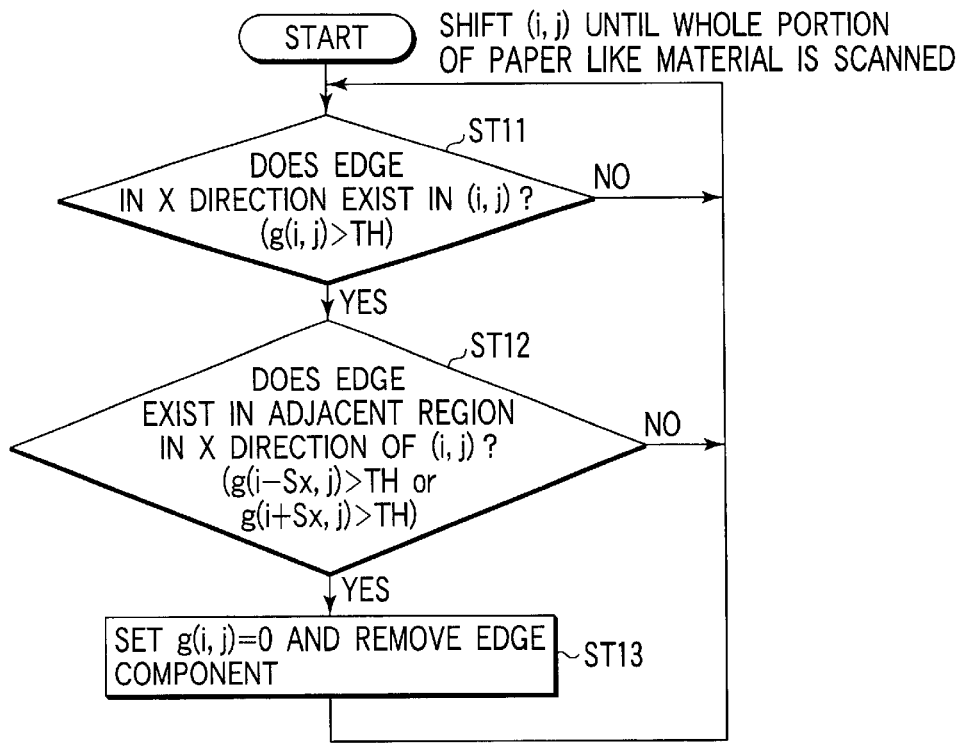
F I G. 12
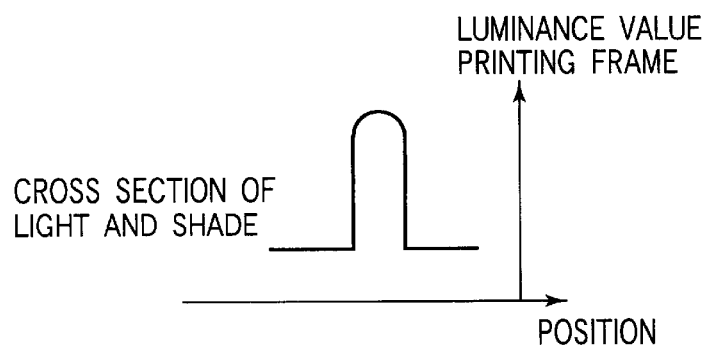
F I G. 13A
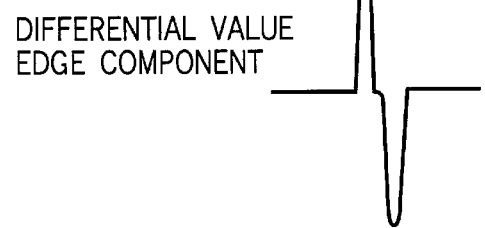
F I G. 13B

CONNECTION/MERGE

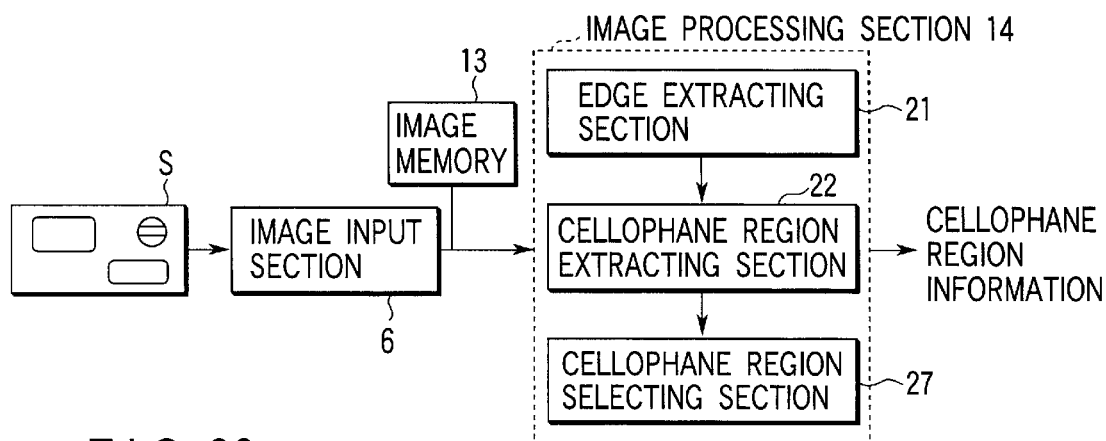
F I G. 20
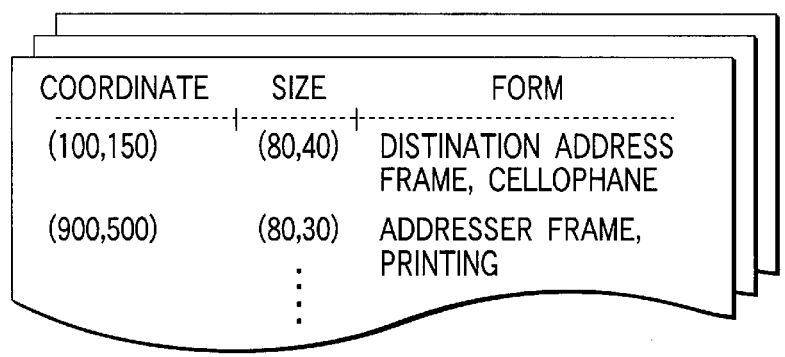
F I G. 21

RECOGNITION APPARATUS AND RECOGNITION METHOD

CROSS-REFERENCE TO RELATED APPLICATIONS

This application is based upon and claims the benefit of priority from the prior Japanese Patent Application No. 2000-071140, filed Mar. 14, 2000, the entire contents of which are incorporated herein by reference.

BACKGROUND OF THE INVENTION

This invention relates to a recognition apparatus and recognition method for recognizing sorting information (destination address) as a character string written within a cellophane region or label region of a paper-like material, for example, a postal matter and a paper-like material processing apparatus and paper-like material processing method for sorting and processing the paper-like material based on the sorting information recognized by the recognition apparatus.

Conventionally, a sorting machine used as a paper-like material processing apparatus for sorting and processing the paper-like material based on sorting information as an address (character string) written on a paper-like material, for example, a postal matter is put into practice.

In postal matters used as the paper-like materials, particularly direct mails processed by the above sorting machine, there are many cases wherein a destination address is written within a cellophane frame (the address written on an internal enveloped can be observed from the exterior through the cellophane region).

Therefore it is useful to find out the cellophane frame for destination address recognition since finding of the cellophane frame substantially leads to finding of the address region.

Conventionally, an optical system exclusively used for extracting the cellophane region is used to detect light totally reflected from the cellophane surface and extract the cellophane region.

A method using the optical system exclusively used for extracting the cellophane region requires the additional cost of the optical system.

Further, it is desired to extract the cellophane region based only on an image of light and shade without using the optical system for extracting the cellophane region, but it is difficult to detect the cellophane region based on a difference in the light intensity since the difference in the light intensity is small between an internal portion (cellophane portion) of the cellophane frame and an outside portion (a surface of the envelope) thereof when the image of light and shade is used.

When the image of light and shade is used, a line between the cellophane portion and the surface of the envelope can be sometimes observed, but it is not clear and it is often cut off.

Further, since the addresser frame is often printed, the addresser frame (printed frame) is often extracted instead of the destination addressee frame (cellophane frame) if the frame is simply extracted. In this case, a destination address is erroneously recognized and there occurs a problem that the letter is erroneously sorted based on the erroneous recognition.

BRIEF SUMMARY OF THE INVENTION

An object of this invention is to provide a recognition apparatus and recognition method capable of solving a problem that a cellophane region or label region within which a character string is written as sorting information cannot be correctly extracted, the sorting information is erroneously recognized and a paper-like material is erroneously sorted, correctly extracting a cellophane region or label region within which a character string is written as sorting information and preventing occurrence of erroneous recognition of the sorting information and erroneous sorting of the paper-like material.

According to a first aspect of this invention, there is provided a recognition apparatus for recognizing sorting information as a character string written within a cellophane region or label region of a paper-like material, comprising reading means for reading a density value of each pixel in a main scanning direction and sub-scanning direction of the paper-like material; first determining means for determining a portion in which a variation in the density value exceeds a preset value based on the density value of each pixel read by the reading means; second determining means for determining the cellophane region or label region of the paper-like material based on the portion which is determined by the first determining means that a variation in the density value exceeds the preset value; and recognizing means for recognizing the sorting information based on the character string written within the cellophane region or label region determined by the second determining means.

According to a second aspect of this invention, there is provided a recognition method for recognizing sorting information as a character string written within a cellophane region or label region of a paper-like material, comprising a reading step of reading a density value of each pixel in a main scanning direction and sub-scanning direction of the paper-like material; a first determining step of determining a portion in which a variation in the density value exceeds a preset value based on the density value of each pixel read in the reading step; a second determining step of determining the cellophane region or label region of the paper-like material based on the portion which is determined in the first determining step that a variation in the density value exceeds the preset value; and a recognizing step of recognizing the sorting information based on the character string written within the cellophane region or label region determined in the second determining step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a diagram showing the schematic construction of image processing section according to a third embodiment of this invention;

FIGS. 11A and 11B are diagrams showing a density value and a differential value thereof;

FIG. 12 is a flowchart for illustrating an edge removing process;

FIGS. 13A and 13B are diagrams showing a density value and a differential value thereof;

FIG. 20 is a diagram showing the schematic construction of image processing section according to a sixth embodiment of this invention;

FIG. 21 is a view for illustrating an example of paper-like material form information;

DETAILED DESCRIPTION OF THE INVENTION

There will now be described a first embodiment of this invention with reference to the accompanying drawings.

Figure 1:
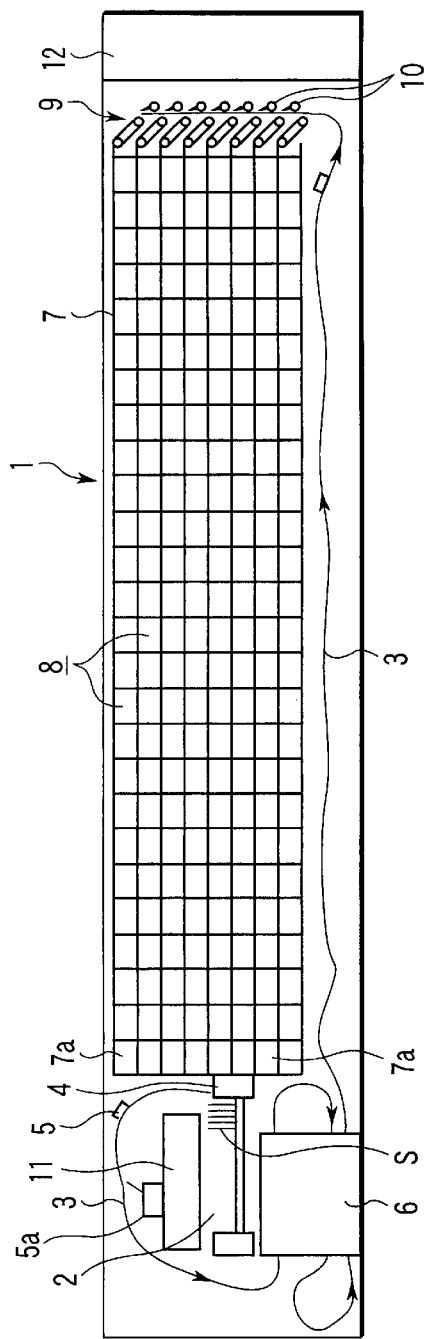
FIG. 1 is a view showing the schematic structure of a paper-like material processing apparatus for explaining an embodiment of this invention.
Figure 2:
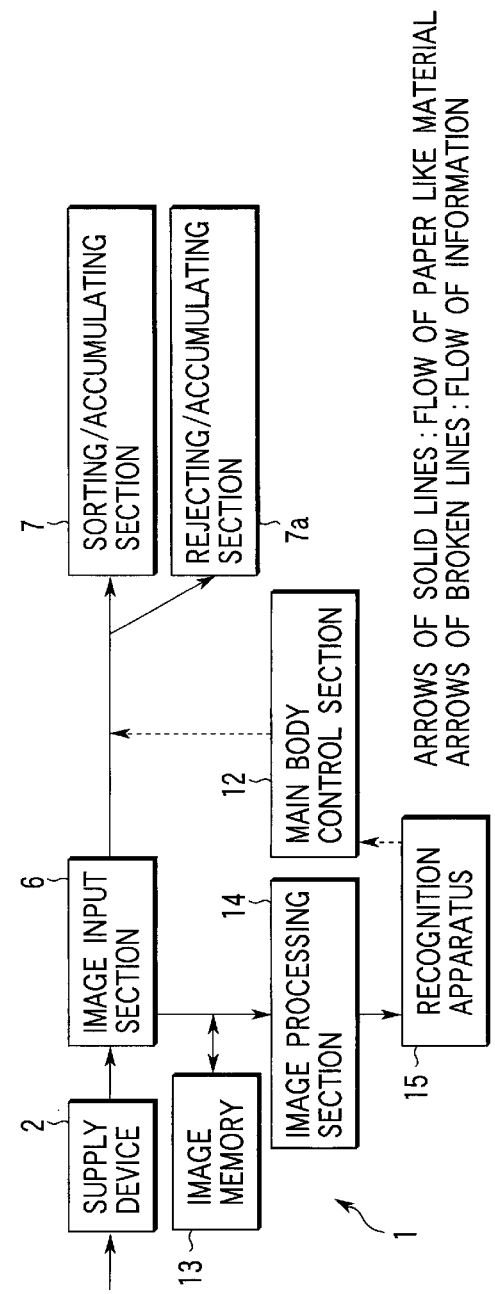
FIG. 2 is a block diagram showing the construction of a control circuit of the paper-like material processing apparatus.

FIG. 1 shows the schematic structure of a paper-like material processing apparatus (paper-like material sorting apparatus) 1 of this invention and FIG. 2 shows the construction of a control circuit of the paper-like material processing apparatus 1.

As shown in FIG. 1, the paper-like material processing apparatus 1 includes a supply section (supplying device) 2 for receiving a plurality of paper-like materials S each having a first surface on which sorting information (character string, destination address) is written or printed with the first surfaces facing the same direction and the one-side ends aligned in the standing position and sequentially supplying the paper-like materials S to a preset take-out position. A take-out section 4 for taking out the paper-like materials S supplied from the supply section 2 for each sheet along a main feeding path 3 is arranged in the take-out position of the paper-like material S.

The paper-like material is in the form of a sheet or a board.

The paper is a thin, flexible material made usually in sheets from a pulp prepared from rags, wood, or other fibrous material, etc.

The paper-like material S taken out by the take-out section 4 is fed via the main feeding path 3 having a conveyor belt running at constant speed. A foreign material/hardness detecting section 5 for detecting a foreign material when the foreign material is contained in the paper-like material S and detecting the hardness of the paper-like material S is disposed on the main feeding path 3. An excluding/accumulating section 5a for excluding a paper-like material S which is so determined that it cannot be subjected to the mechanical process as the result of detection by the foreign material/hardness detecting section 5 is disposed on a feeding path branched from the main feeding path 3 on the downstream side of the foreign material/hardness detecting section 5 in the feeding direction.

A reading section 6 for reading an image by optically scanning the first surface of the paper-like material S to read sorting information (classification information, address information) is disposed on the main feeding path 3 on the downstream side of the foreign material/hardness detecting section 5 in the feeding direction.

To the end portion of the main feeding path 3 on the downstream side of the reading section 6, a sorting/accumulating section (sorting/accumulating device) 7 for sorting the paper-like materials S into preset sorting pockets (sorting destination) and accumulating them is connected. The sorting destination indicates the position of a sorting pocket in which the paper-like materials S are sorted and accumulated. In the final stage of the sorting/accumulating section 7, a rejecting/accumulating section 7a for sorting and accumulating paper-like materials S rejected is disposed.

The sorting/accumulating section 7 has a plurality of sorting pockets 8 divided into a plurality of stages and a plurality of columns. For example, it is formed of 8 stages× 25 columns=200 sorting pockets 8. Sorting gates (not shown) are provided above the respective sorting pockets 8 and the paper-like materials S are sorted into the preset pockets 8 by selectively opening the sorting gates. The sorting process is instructed by a main body control section 12.

In FIG. 1, a plurality of selection gates 10 corresponding to stage pass sections 9 of the sorting/accumulating section 7 are provided in the vicinity of the end of the main feeding path 3 extending towards the sorting/accumulating section 7 and the main feeding path 3 is selectively connected to one of the plurality of stages via a corresponding one of the stage pass sections 9 by selectively opening one of the selection gates 10.

Further, an operation panel 11 by which various input operations are effected by an operator is provided on the left front side of the paper-like material processing apparatus 1 in FIG. 1 and the main control section (main body control section) 12 for controlling the sorting operation of the paper-like material processing apparatus 1 is provided on the right side of the paper-like material processing apparatus 1 in FIG. 1.

The main control section 12 controls the whole portion of the paper-like material processing apparatus 1 and, as shown in FIG. 2, it is connected to an image memory 13, image processing section 14, recognition apparatus 15, sorting specification control section (not shown), take-out section 4 and reading section 6.

The image memory 13 stores image data from the reading section 6.

The image processing section 14 extracts and outputs image data of a destination address portion for each image data stored in the image memory 13.

The recognition apparatus 15 recognizes sorting information of the paper-like material S by use of image data of the address portion from the image processing section 14.

The sorting specification control section specifies a sorting destination of the paper-like material S, that is, one of the sorting pockets 8 into which the paper-like material S is sorted and accumulated based on the sorting information supplied from the recognition apparatus 15.

The main control section 12 determines whether two paper-like materials are simultaneously taken out or not based on the recognition result from the recognition apparatus 15, and if two paper-like materials S are simultaneously taken out, it causes the paper-like materials S to be fed to and sorted into the rejecting/accumulating section 7a.

Figure 3:
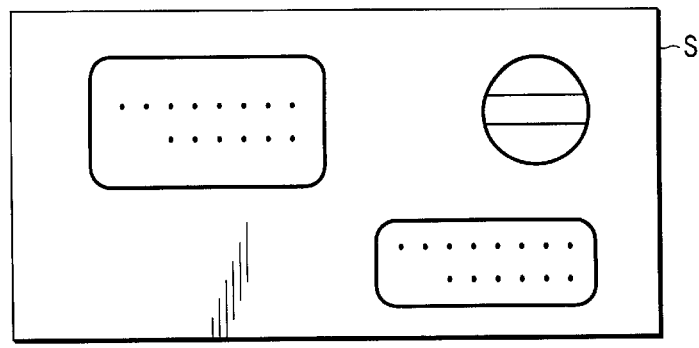
FIG. 3 is a view showing the schematic structure of a paper-like material.

As shown in FIG. 3, a zip code or destination address which is sorting information is written within the cellophane frame of the paper-like material S.

The image processing section 14 determines whether or not a cellophane frame exists for each image data stored in the image memory 13, and if it is determined that the cellophane frame exists as the result of determination, it outputs image data within the cellophane frame as image data of the destination address portion. Further, if it is determined that the cellophane frame does not exist as the result of determination, the image processing section 14 outputs image data of the destination address portion extracted by use of other section.

The image processing section 14 includes edge extracting section 21 and cellophane region extracting section 22 as a construction for determining whether a cellophane frame exists or not.

Figure 4:
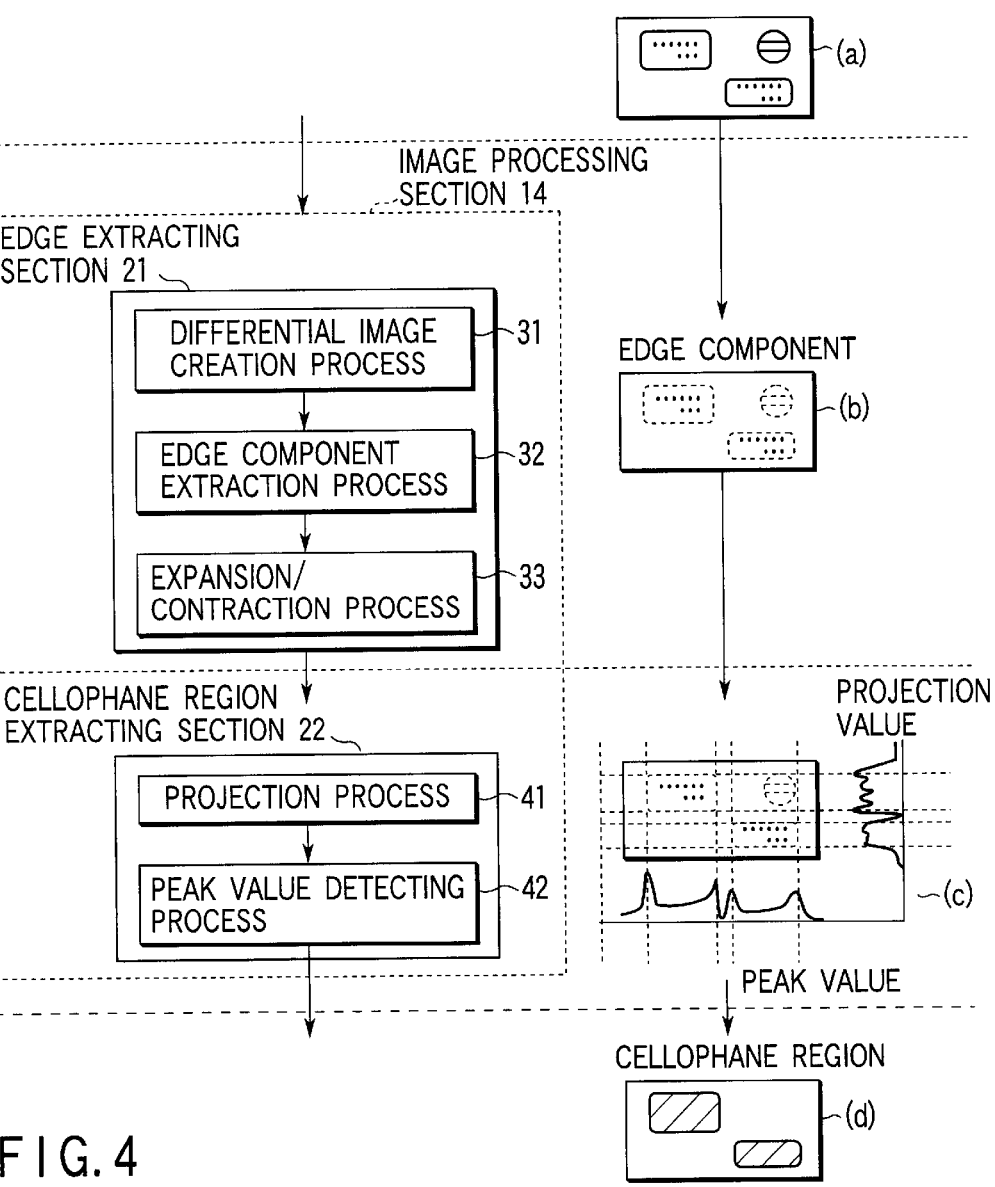
FIG. 4 is a diagram showing the schematic construction of image processing section and the processing condition thereof.

As shown in FIG. 4, the edge extracting section 21 is constructed to perform a differential image creation process 31, edge component extraction process 32 and expansion/contraction process 33.

The differential image creation process 31 is a process for creating an edge component image (for example, differential image) shown in (b) of FIG. 4 based on image data (density data of 256 gradation levels for each pixel) shown in (a) of FIG. 4 and stored in the image memory 13. The image can be created by applying an operator of Sobel, operator of Robinson, operator of Kirsch or Laplacian filter to the image of the paper-like material S.

For example, the following calculation can be made.

$$g(i, j) = [|\{f(i-1, j-1) + f(i-1, j) + f(i-1, j+1)\} - \quad (1)$$
$$\{f(i+1, j-1) + f(i+1, j) + f(i+1, j+1)\}| +$$
$$|\{f(i-1, j-1) + f(i, j-1) + f(i+1, j-1)\} -$$
$$\{f(i-1, j+1) + f(i, j+1) + f(i+1, j+1)\}|]/2$$

where f(i,j) denotes the luminance of a coordinate (i,j) and g(i,j) denotes a differential image.

Figure 5:
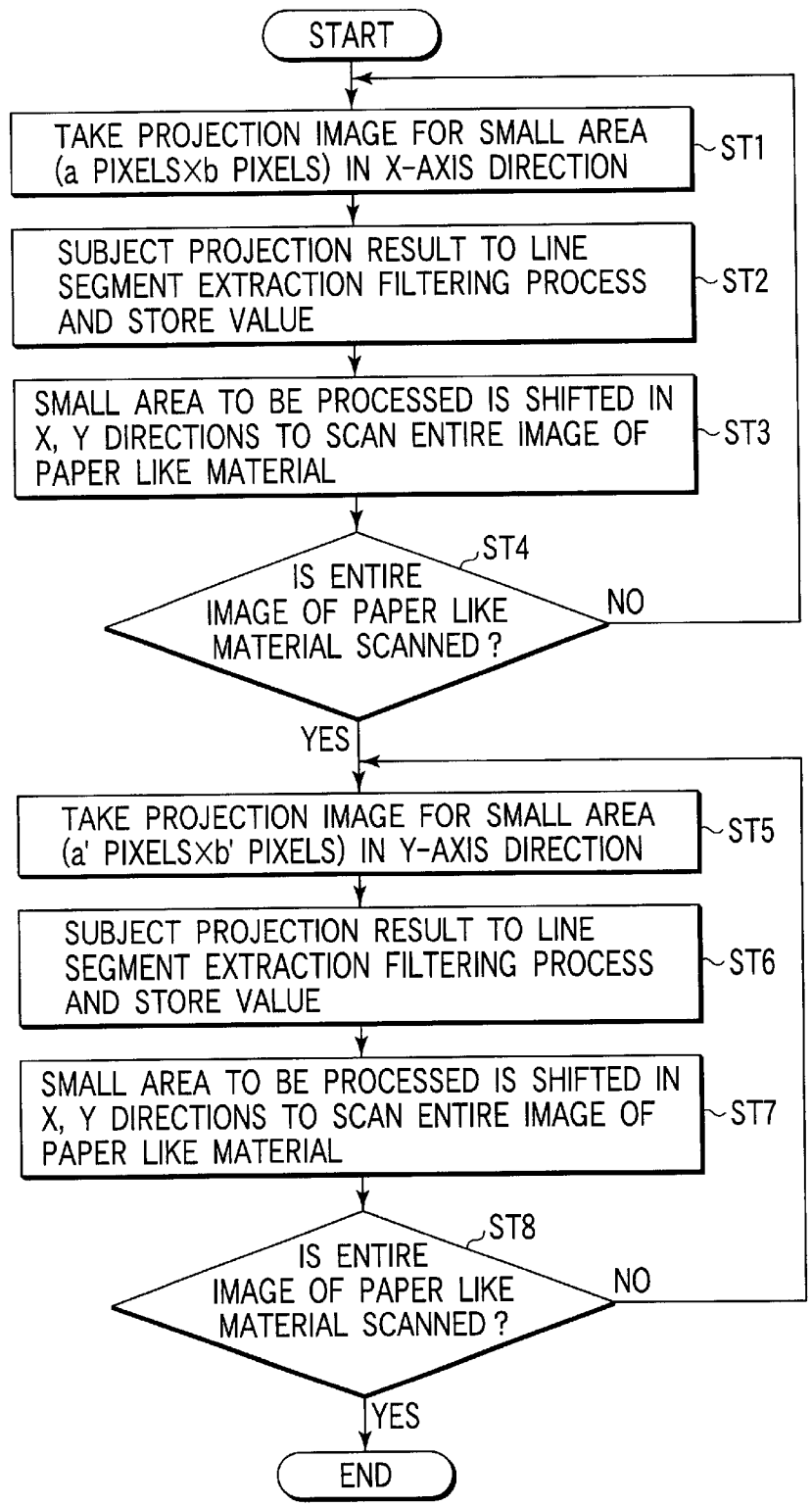
FIG. 5 is a flowchart for illustrating an edge component extracting process.

After the differential image creation process 31, the edge component is extracted by the edge component extraction process 32. The flow of the edge component extraction process 32 is shown in FIG. 5 and the concept of the edge component extraction process 32 is shown in FIG. 6.

Figure 6:
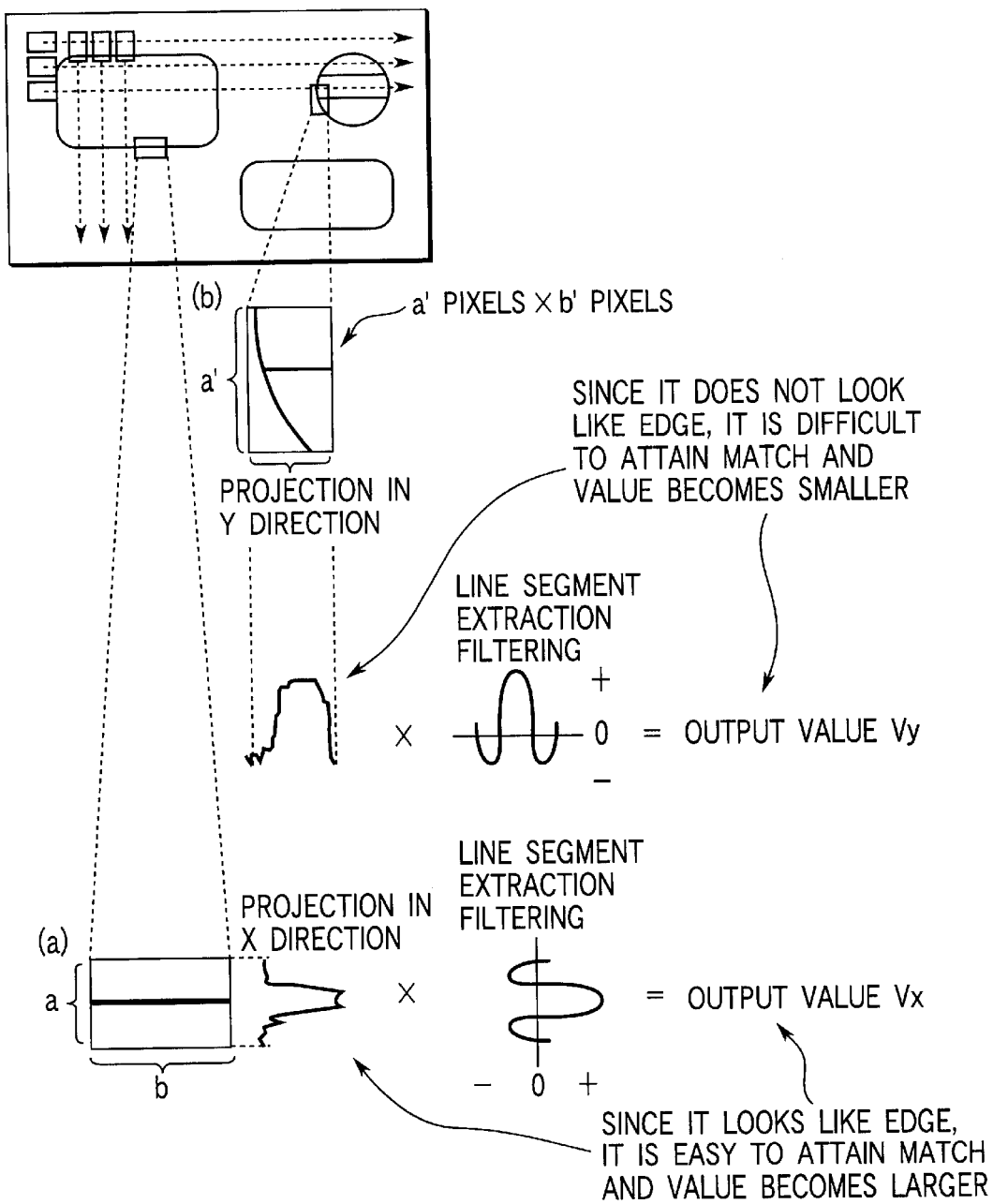
FIG. 6 is a conceptual diagram for illustrating the edge component extracting process.

That is, as shown in (a) and (b) of FIG. 6, projection images for small areas (a pixels×b pixels, a' pixels×b' pixels) in the X-axis and Y-axis directions are taken (ST1, ST5) and the resultant images are subjected to the line segment extraction filtering process (ST2, ST6). The small area to be processed is shifted in the X-axis and Y-axis directions to scan the entire portion of the paper-like material S (ST3, ST7), projection images in the X-axis and Y-axis directions are taken (ST1, ST5) until the process for scanning the entire portion of the paper-like material S is terminated (ST4, ST8), and the resultant images are subjected to the line segment extraction filtering process (ST2, ST6).

As a line segment extracting filter, for example, a DOG (Difference Of Gaussian) filter as shown in FIG. 6 can be used.

In a case where the small area indicates a portion which looks like an edge as shown in (a) of FIG. 6, an output value Vx as the edge component becomes larger since the matching degree between the projected image and the result obtained by the line segment extraction filter becomes high. In a case where the small area indicates a portion which does not look like an edge as shown in (b) of FIG. 6, the edge component is small and an output value Vy becomes smaller since the matching degree between the projected image and the result obtained by the line segment extraction filter becomes low. The edge component can be extracted by effecting the edge component extraction process 32 to scan the entire image of the paper-like material S.

After this, the expansion/contraction process 33 can be effected for the result of the above process to eliminate noise.

As shown in FIG. 4, the cellophane region extracting section 22 is constructed to effect a projection process 41 and peak value detecting process 42.

As shown in (c) of FIG. 4, the projection process 41 is to effect the projection process for the process result (edge component) supplied from the edge extraction section 21 in the X-axis and Y-axis directions. The peak value detecting process 42 detects a region in which the edge components are concentrated based on peak values of the projection results (projection values) of the projection process 41 so as to extract a cellophane region as shown in (d) of FIG. 4. For example, it outputs position information or the like.

As a result, when extracting the cellophane region, the image processing section 14 outputs image data of the cellophane region among the image data of one image of the paper-like material S stored in the image memory 13 to the recognition apparatus 15 as sorting information.

The projection process 41 is to effect the projection process in the X-axis direction by adding an output value as an edge component for each pixel supplied from the edge extracting section 21 in the X-axis direction. The projection process 41 is to effect the projection process in the Y-axis direction by adding an output value as an edge component for each pixel supplied from the edge extracting section 21 in the Y-axis direction.

With the above construction, the sorting process for a paper-like material S having a cellophane frame is explained.

For example, the paper-like material S supplied from the supplying section 2 is taken out by the take-out section 4 and fed along the main feeding section 3 and the surface of the paper-like material S is scanned and read by image inputting section 6. An image signal scanned and read by the image inputting section 6 is stored into the image memory 13.

Thus, the image processing section 14 determines whether the cellophane frame exists or not for each image data stored in the image memory 13 and if it is determined as the result of determination that the cellophane frame exists, image data in the cellophane frame is transmitted to the recognition apparatus 15 as image data of a destination address portion.

The recognition apparatus 15 reads a destination address which is sorting information from the image supplied from the image processing section 14 and supplies the result of reading to the main body control section 12.

As a result, the main body control section 12 effects the control operation to supply the paper-like material S to the sorting/accumulating section 7 according to the result of reading.

As described above, it is possible to correctly extract the cellophane region within which a destination address as sorting information is written and prevent occurrence of erroneous recognition of sorting information and erroneous sorting of the paper-like material.

In the above example, a case wherein the destination address as sorting information is written within the cellophane region of the paper-like material is explained, but this is not limitative. For example, in a case of a label on or within which the destination address as sorting information is written, image data of a portion corresponding to the label can be extracted and output by an edge detecting process based on a label end portion and corresponding to the edge detecting process based on the cellophane frame.

This is particularly effective when the color of the label and the color of the paper-like material (surface of the envelope) to which the label is attached are similar.

Next, a second embodiment is explained in detail.

Figure 7:
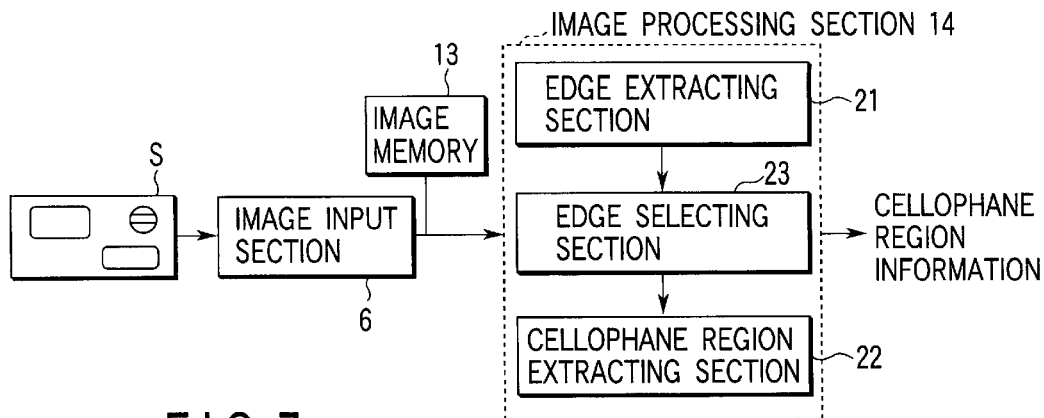
FIG. 7 is a diagram showing the schematic construction of image processing section according to a second embodiment of this invention.

The second embodiment is attained by adding edge selecting section 23 to the image processing section 14 of the first embodiment. As shown in FIG. 7, the edge selecting section 23 is provided between the edge extracting section 21 and the cellophane region extracting section 22 shown in FIG. 4. Since the edge extracting section 21 and cellophane region extracting section 22 are the same as those of the first embodiment, the explanation therefor is omitted.

The edge selecting section 23 selects an edge which looks like a cellophane frame from the edge components extracted by the edge extracting section 21 and outputs the result of selection to the cellophane region extracting section 22.

The flow of the process by the edge selecting section 23 in the image processing section 14 of the second embodiment is explained below.

Figure 8:
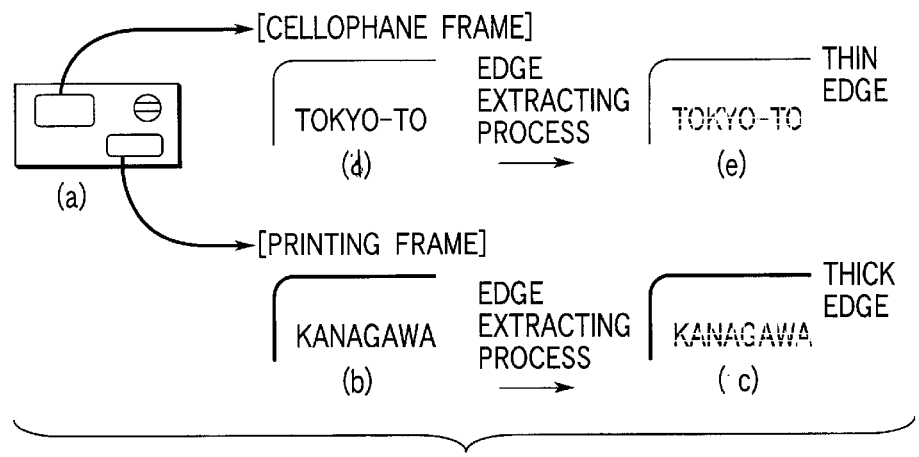
FIG. 8 is a view for illustrating the feature of an edge component extracted from image data of a paper-like material.

Like the first embodiment, the edge extracting section 21 extracts an edge component from image data of a paper-like material S. Then, the edge selecting section 23 selects a thin edge component which is a characteristic of the edge of the cellophane region from the edge components extracted by the edge extracting section 21 shown in (a) of FIG. 8. An edge component value such as a differential value takes a large value in a portion in which the density difference is large and takes a small value in a portion in which the density difference is small. Since the printing frame is clear, it takes a large value (in FIG. 8, it is indicated by a thick solid line) as the edge component value as shown in (b), (c) of FIG. 8. On the other hand, since the cellophane frame is not so clear as the printing frame, the edge component value thereof takes a slightly small value (in FIG. 8, it is indicated by a thin solid line) as shown in (d), (e) of FIG. 8.

Figure 9:
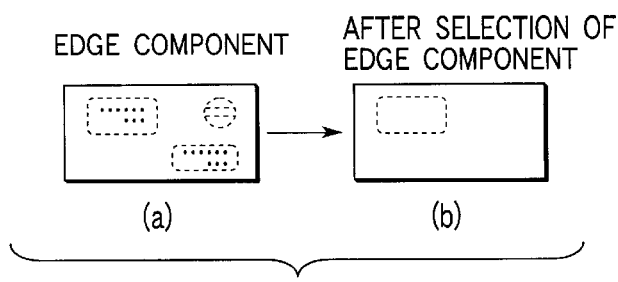
FIG. 9 is a view for illustrating a state in which the edge component only of the boundary of a cellophane region is selected with respect to the edge components extracted by edge extracting section.

Then, the edge selecting section 23 sets the width TH1 to TH2 of a value to be selected to select only the edge taking a slightly smaller value which is a characteristic of the cellophane frame (extract the edge component $g(i,j)$ in a range of $TH1<g(i,j)<TH2$) so that the edge component only of the boundary of the cellophane region as shown in (b) of FIG. 9 can be extracted from the edge components from the edge component extracting section 21 shown in (a) of FIG. 9.

After this, the cellophane region is extracted based on the thus obtained edge component by the cellophane region extracting section 22 in the same manner as in the first embodiment. Since only the edge of a portion which looks like a cellophane frame is selected by the preceding-stage edge selecting section 23, the stable extraction process which is less subject to error can be effected.

Next, a third embodiment is explained in detail.

The third embodiment is obtained by adding edge removing section 24 to the image processing section 14 of the first embodiment. As shown in FIG. 10, the edge removing section 24 is provided between the edge extracting section 21 and the cellophane region extracting section 22 shown in FIG. 4. Since the edge extracting section 21 and cellophane region extracting section 22 are the same as those of the first embodiment, the explanation therefor is omitted.

The edge removing section 24 removes an edge which looks like a printing frame from the edge components extracted by the edge extracting section 21 and outputs the result of removal to the cellophane region extracting section 22.

The flow of the process by the edge removing section 24 in the image processing section 14 of the third embodiment is explained below.

Like the first embodiment, the edge extracting section 21 extracts an edge component from image data of a paper-like material S. Then, the edge removing section 24 selects a thick edge component which is a characteristic of the printing frame from the edge components extracted by the edge extracting section 21 shown in (a) of FIG. 8. An edge component value such as a differential value takes a large value in a portion in which the density difference is large and takes a small value in a portion in which the density difference is small. Since the printing frame is clear, it takes a large value (in FIG. 8, it is indicated by the thick solid line) as the edge component value as shown in (b), (c) of FIG. 8. On the other hand, since the cellophane frame is not so clear as the printing frame, the edge component value thereof takes a slightly smaller value (in FIG. 8, it is indicated by the thin solid line) as shown in (d), (e) of FIG. 8.

Then, the edge removing section 24 sets a threshold value TH3 of a value to be removed so as to remove an edge taking a value larger than the threshold value (if $g(i,j)>TH3$, the edge component $g(i,j)=0$).

Thus, the process by the succeeding-stage cellophane region extracting section 22 can be effected without receiving any influence by the printing frame.

Further, a process for removing adjacent two edge components can be effected in the edge removing section 24.

Since a thick and clear printing frame as shown in FIG. 11A has edge components on both sides of the line, double edge components may be extracted as shown in FIG. 11B as the result of edge extraction process in some cases. That is, since there is a strong possibility that two parallel adjacent edge components belong to the printing frame, it becomes possible to extract a cellophane region without receiving the influence by the printing frame by removing the above edges.

Specifically, as shown in the flowchart of FIG. 12, if it is determined that a certain small region has a large edge component value and looks like an edge and when a different small region which is parallel to and lies near the edge also has a large edge component value, they are removed.

That is, whether or not an edge in the X direction exists in a coordinate (i,j) corresponding to a preset pixel is determined (g(i,j)>TH) (ST11). As the result of determination, if an edge in the X direction exists, whether or not an edge exists in the adjacent position in the X direction of the coordinate (i,j) is determined (g(i−Sx,j)>TH or g(i+Sx,j)>TH) (ST12). As the result of determination, if an edge exists in the adjacent position in the X direction, g(i,j)=0 is set and the edge component is removed (ST13).

If it is determined in the step ST11 that no edge exists in the X direction or if it is determined in the step ST12 that no edge exists in the adjacent position in the X direction, the edge component is removed in the step ST13, then the coordinate (i,j) is shifted and the process returns to the step ST11 so as to process the whole portion of the paper-like material S.

Further, in the edge removing section 24, a process for identifying the direction of the edge component may be effected. Unlike the case of the equation (1) wherein the magnitude of the differential value is detected, an edge component gx(i,j) in the X direction and an edge component gy(i,j) in the Y direction are derived as follows.

$$gx(i, j) = \{f(i-1, j-1) + f(i-1, j) + f(i-1, j+1)\} -$$
$$\{f(i+1, j-1) + f(i+1, j) + f(i+1, j+1)\}$$
$$gy(i, j) = \{f(i-1, j-1) + f(i, j-1) + f(i+1, j-1)\} -$$
$$\{f(i-1, j+1) + f(i, j+1) + f(i+1, j+1)\}$$

Figure 14:
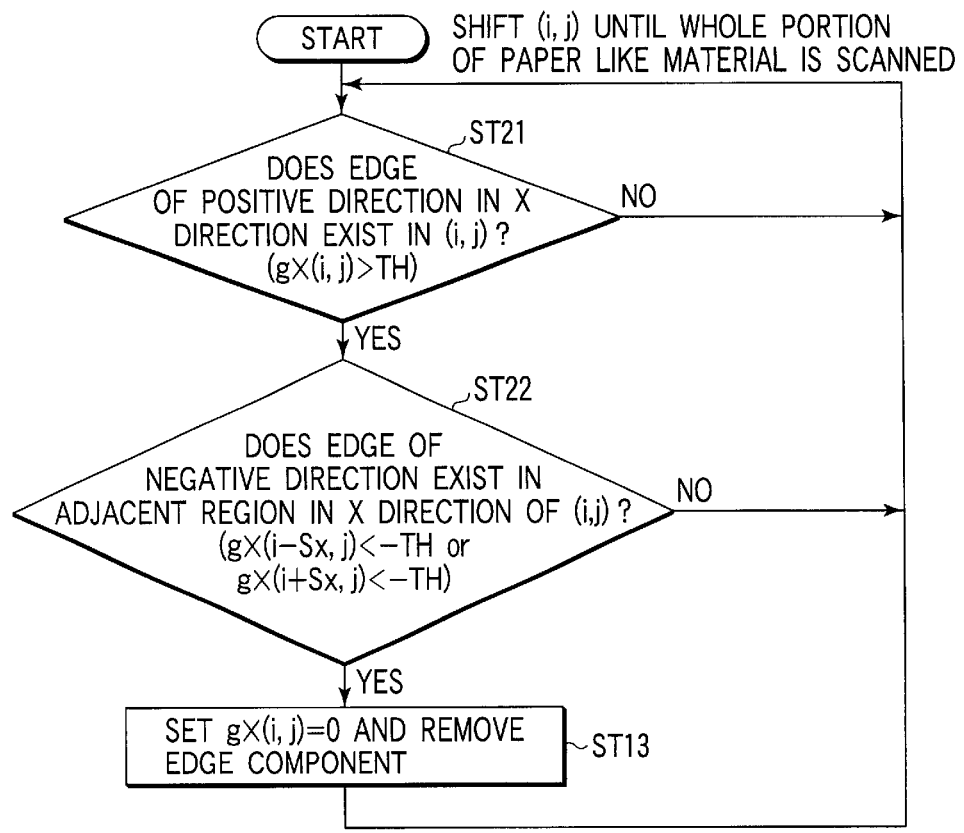
FIG. 14 is a flowchart for illustrating an edge removing process.

Thus, the direction of a change of the edge can be identified based on a positive or negative sign of an image g(i,j) as shown in FIGS. 13A and 13B. As shown in FIG. 14, when two parallel adjacent edge components are edge components of different directions, a process for determining the edge direction is effected as a process for removing the edge components since it is considered that the edge components are extracted from the same printing frame line.

That is, whether or not an edge of a positive direction in the X direction exists in a coordinate (i,j) corresponding to a preset pixel is determined (g(i,j)>TH) (ST21). As the result of determination, if an edge in the X direction exists, whether or not an edge of a negative direction exists in the adjacent region in the X direction of the coordinate (i,j) is determined (g(i−Sx,j)<−TH or g(i+Sx,j)<−TH) (ST22). As the result of determination, if an edge exists in the adjacent region in the X direction, g(i,j)=0 is set and the edge component is removed (ST23).

If it is determined in the step ST21 that no edge exists in the X direction or if it is determined in the step ST22 that no edge exists in the adjacent region in the x direction, the edge component is removed in the step ST23, then the coordinate (i,j) is shifted and the process returns to the step ST21 so as to process the whole portion of the paper-like material S.

A cellophane region is extracted based on the thus obtained edge component by use of the cellophane region extracting section 22 in the same manner as in the first embodiment. Since an edge which looks like a printing frame is removed by the preceding-stage edge removing section 24, the stable extraction process which is less subject to error can be effected.

Next, a fourth embodiment is explained in detail.

Figure 15:
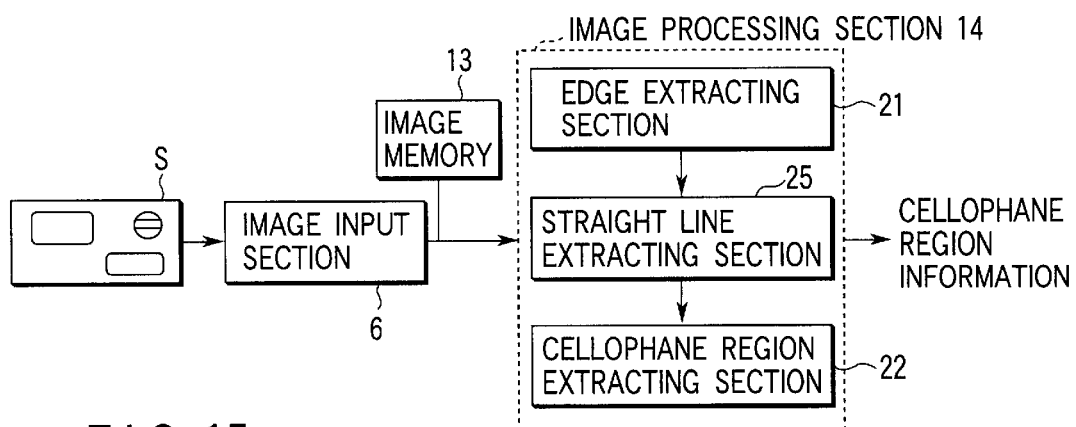
FIG. 15 is a diagram showing the schematic construction of image processing section according to a fourth embodiment of this invention.

The fourth embodiment is obtained by adding straight line extracting section 25 to the image processing section 14 of the first embodiment. As shown in FIG. 15, the straight line extracting section 25 is provided between the edge extracting section 21 and the cellophane region extracting section 22 shown in FIG. 4. Since the edge extracting section 21 and cellophane region extracting section 22 are the same as those of the first embodiment, the explanation therefor is omitted.

The straight line extracting section 25 merges edges extracted by the edge extracting section 21 into a straight line while admitting or permitting cut-off portions and outputs the result of merging into the straight line to the cellophane region extracting section 22.

The flow of the process by the straight line extracting section 25 in the image processing section 14 of the fourth embodiment is explained below.

Like the first embodiment, the edge extracting section 21 extracts an edge component from image data of a paper-like material S. Then, the straight line extracting section 25 merges extracted edge components into a straight line while permitting the cut-off portions thereof and extracts the straight line.

Figure 16:
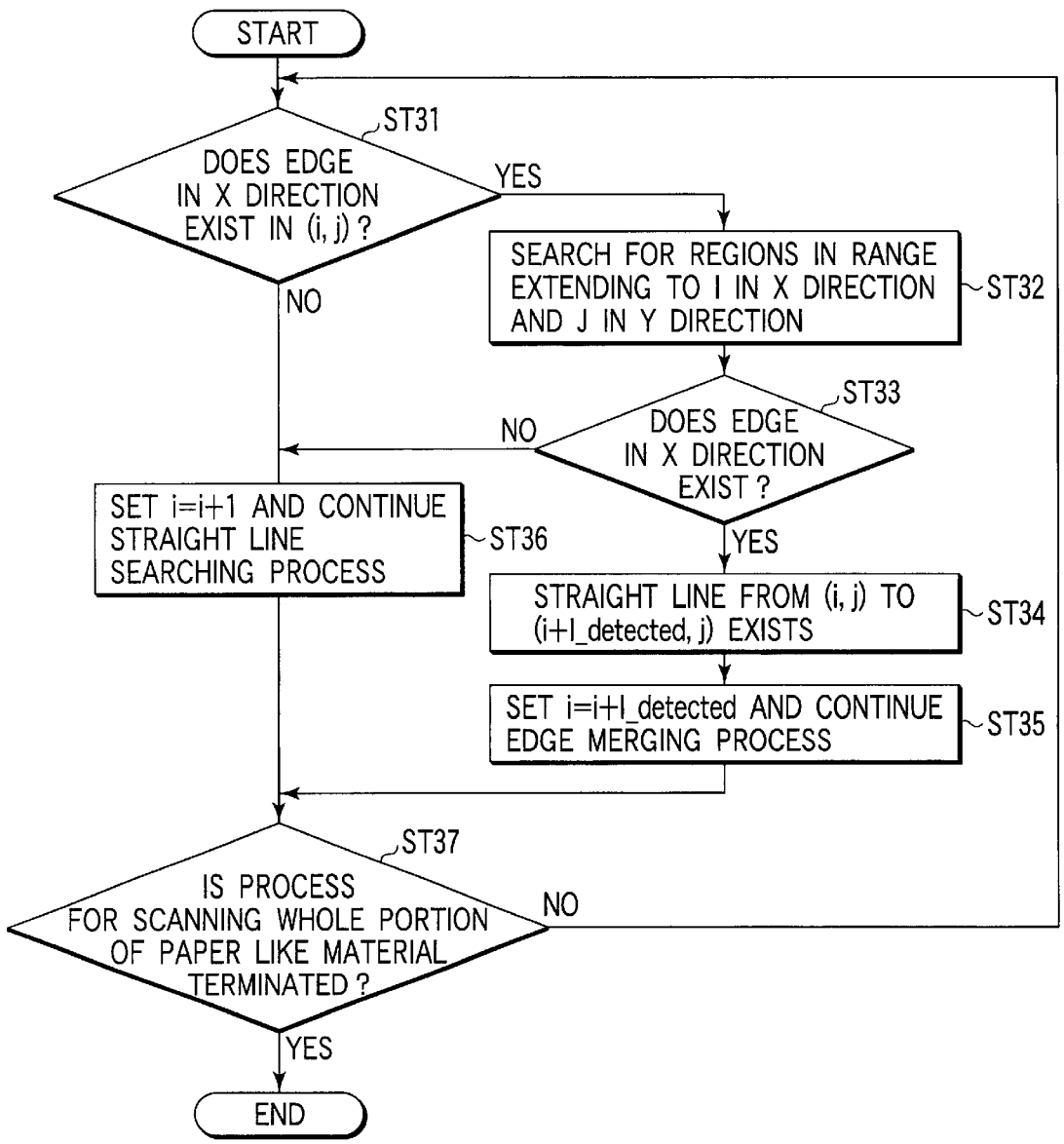
FIG. 16 is a flowchart for illustrating a straight line extracting process.

Specifically, the straight line extracting section 25 effects the process as shown by the flow of the process in FIG. 16.

That is, whether or not an edge in the X direction exists is determined based on an edge component g(i,j) of an image of a coordinate (i,j) corresponding to a preset pixel (ST31). As the result of determination, if an edge in the X direction exists, regions g(i+1,j), . . . , g(i+I,j+J) in a range extending to I in the X direction and J in the Y direction from (i,j) are checked to search for edge components which are considered to be extracted from the same straight line (ST32).

As the result of searching, whether or not an edge exists in the X direction is determined (ST33). As the result of determination, if an edge exists in the X direction, it is determined that a straight line exists at a distance (i+I_detected,j) from (i,j) (ST34) and the edge merging process is continued by setting i=i+I_detected (ST35).

If it is determined in the step ST31 or ST33 that no edge exists in the X direction, a process for searching for the straight line is continued by setting i=i+1 (ST36).

After the steps ST35, ST36, whether the process for the whole portion of the paper-like material S is terminated or not is determined (ST37), and if it is not terminated, the process returns to the step ST31, and if it is terminated, the process is terminated.

Figure 17:
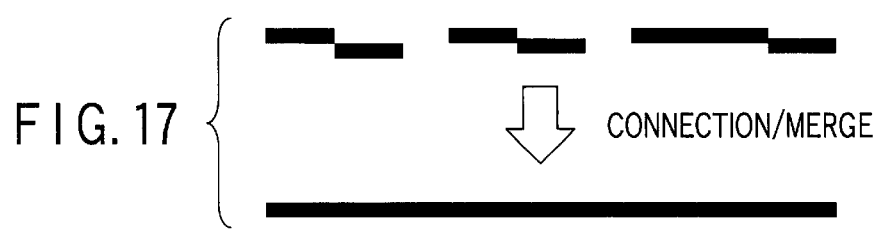
FIG. 17 is a view for illustrating the straight line extracting process.

By checking not only the region (i+1,j) but also the surrounding regions up to I, J in the step ST32, a correct straight line can be extracted as shown in FIG. 17 even if the edge component contains some cut-off portions.

Cut-off portions tend to occur in the edge component if the region frame does not clearly appear as in the cellophane region, and therefore, by effecting the straight line extracting process in which the cut-off portions are permitted, it is possible to correctly extract the straight line without fail.

The process is effected for the whole portion of the paper-like material S to process the edge component in the Y direction in the same manner. A cellophane region is extracted based on the thus obtained straight lines by use of the cellophane region extracting section 22 in the same manner as in the first embodiment.

Next, a fifth embodiment is explained in detail.

Figure 18:
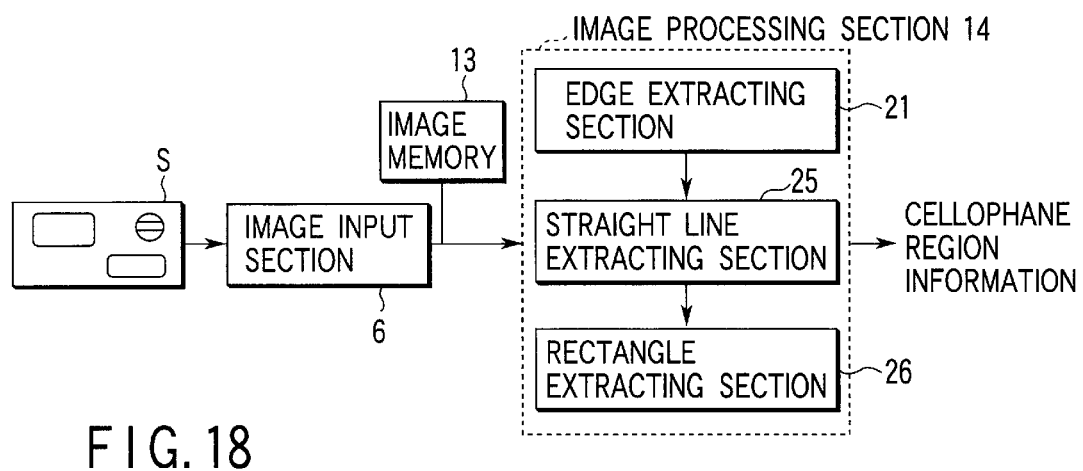
FIG. 18 is a diagram showing the schematic construction of image processing section according to a fifth embodiment of this invention.

As shown in FIG. 18, the fifth embodiment is obtained by replacing the cellophane region extracting section 22 of the fourth embodiment by rectangle extracting section 26. The rectangle extracting section 26 searches a combination of straight lines constructing a rectangle from straight lines extracted by the straight line extracting section 25.

The straight line extracting section 25 merges extracted edge components into a straight line while permitting cut-off portions thereof to extract a straight line. Then, the rectangle extracting section 26 searches a combination of straight lines constructing a rectangle from a set of straight lines to extract a rectangular cellophane region.

Figure 19:
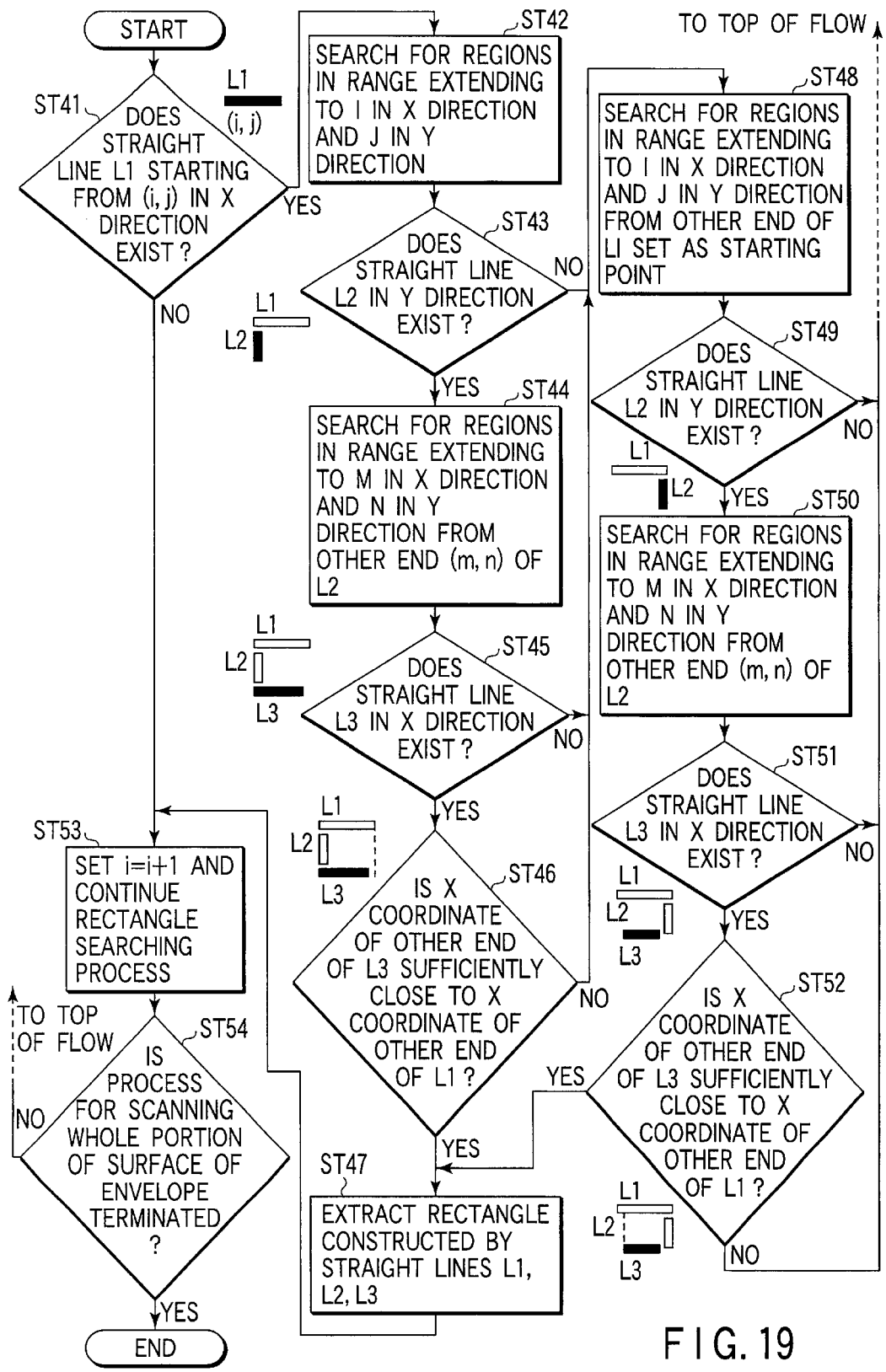
FIG. 19 is a flowchart for illustrating a rectangle extracting process.

Specifically, the rectangle extracting section 26 effects a process as shown by the flow of the process of FIG. 19.

First, whether a straight line L1 in the X direction from a straight line component h(i,j) of a coordinate (i,j) exists or not is checked (ST41). If L1 exists, whether a straight line L2 in the Y direction within a preset distance (for example, I in the X direction and J in the Y direction) from (i,j) exists or not is checked (ST42, ST43). If L2 exists, whether a straight line L3 in the X direction within a preset distance (for example, M in the X direction and N in the Y direction) from the other end point of L2 which is far apart from the line L1 exists or not is checked (ST44, ST45). If L3 exists, whether or not the X coordinate of the far end point of L3 is sufficiently close to the X coordinate of the end point of L1 on the same side thereof is determined (ST46) and if it is sufficiently close, a rectangular region constructed by L1, L2, L3 is extracted (ST47).

On the other hand, if it is determined in the step ST43 that a straight line in the Y direction does not exist, whether or not a straight line L2 in the Y direction exists within a preset distance from the end point of L1 on the side different from that of (i,j) is checked (ST48, ST49). If L2 exists, whether or not a straight line L3 in the X direction exists within a preset distance from the far end point of L2 is checked (ST50, ST51). If L3 exists, whether or not the X coordinate of the far end point of L3 is sufficiently close to the X coordinate of the end point of L1 on the same side thereof is determined (ST52) and if it is sufficiently close, a rectangular region constructed by L1, L2, L3 is extracted (ST47).

If it is determined in the step ST41 that a straight line L1 in the X direction does not exist or if a rectangular region is extracted in the step ST47, the rectangle searching process is continued (ST53) after i=i+1 is set.

After this, whether the process for the whole portion of the paper-like material S is terminated or not is determined (ST54), and if it is not yet terminated, the process returns to the step ST41, and if it is terminated, the process is terminated.

Further, if it is determined in the step ST46 that the X coordinate of the other end point of L3 is not sufficiently close to the X coordinate of the other end point of L1, the process proceeds to the step ST48. If it is determined in the step ST49 that L2 does not exist or if it is determined in the step ST52 that the X coordinate of the other end point of L3 is not sufficiently close to the X coordinate of the other end point of L1, the process returns to the step ST41.

The above process is effected for the whole portion of the paper-like material to search for a rectangle.

In the above example, a combination of two straight lines in the X direction and one straight line in the Y direction is searched for, but the same process can be applied in a case wherein a combination of one straight line in the X direction and two straight lines in the Y direction is searched for.

A stable rectangle extracting process can be effected by extracting a rectangle constructed by three sides since all of the four sides of the rectangle are not always extracted in a case where the region frame of, for example, a cellophane region is not clear. On the other hand, if there are many cases wherein straight lines cannot be extracted, a rectangle can be extracted by use of two straight lines instead of three straight lines. In this case, a rectangle can be extracted when two sides of the rectangle are extracted in the above process.

Next, a sixth embodiment is explained in detail.

The sixth embodiment is obtained by additionally providing cellophane region selecting section 27 to the image processing section 14 of the first embodiment. As shown in FIG. 20, the cellophane region selecting section 27 is provided in the succeeding stage of the edge extracting section 21 and cellophane region extracting section 22 shown in FIG. 4. Since the edge extracting section 21 and cellophane region extracting section 22 are the same as those of the first embodiment, the explanation therefor is omitted.

The cellophane region selecting section 27 selects a cellophane region based on information of the positional relation and form of a cellophane region obtained from the cellophane region extracting section 22.

Figure 22:
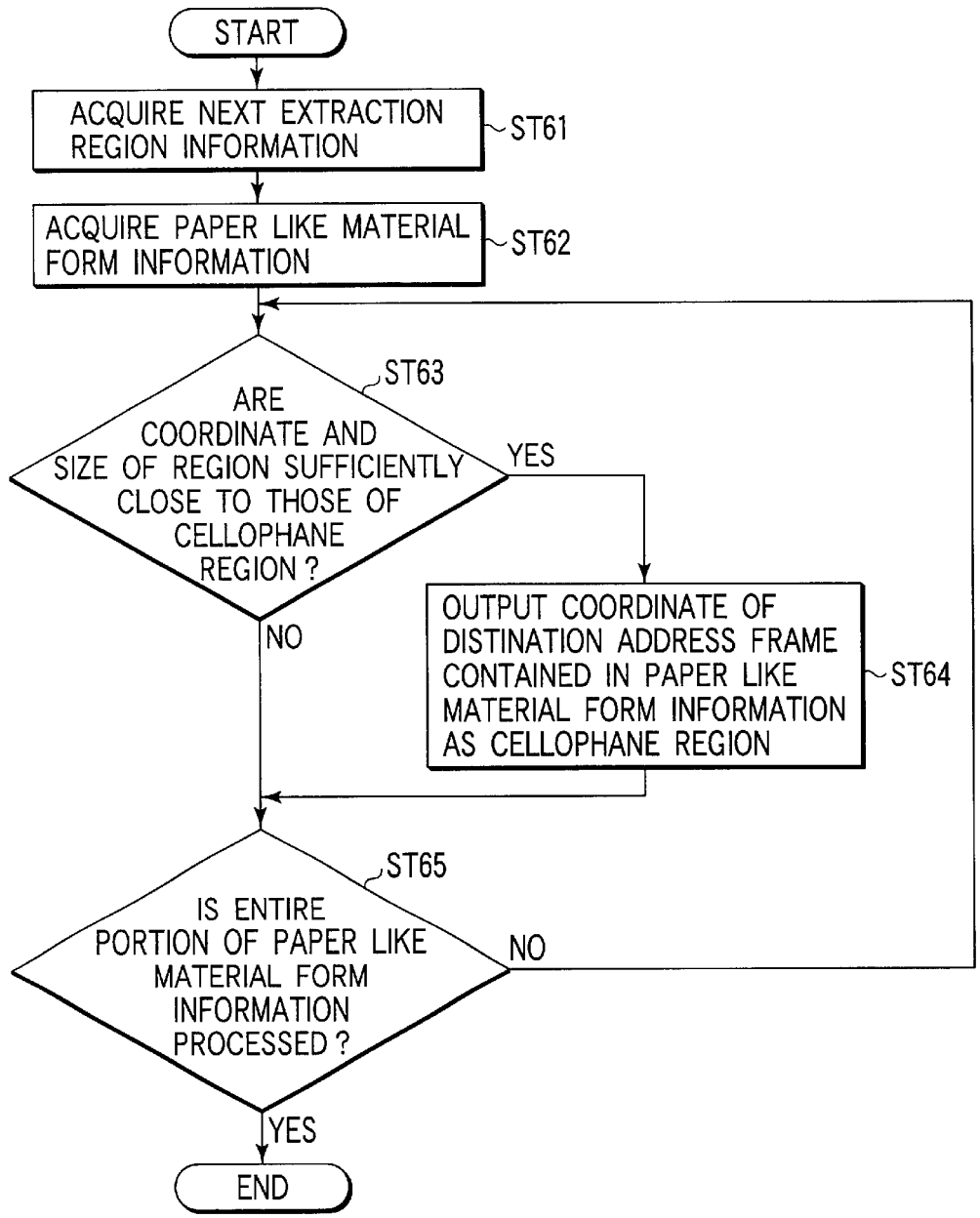
FIG. 22 is a flowchart for illustrating a cellophane region selecting process.
Figure 23:
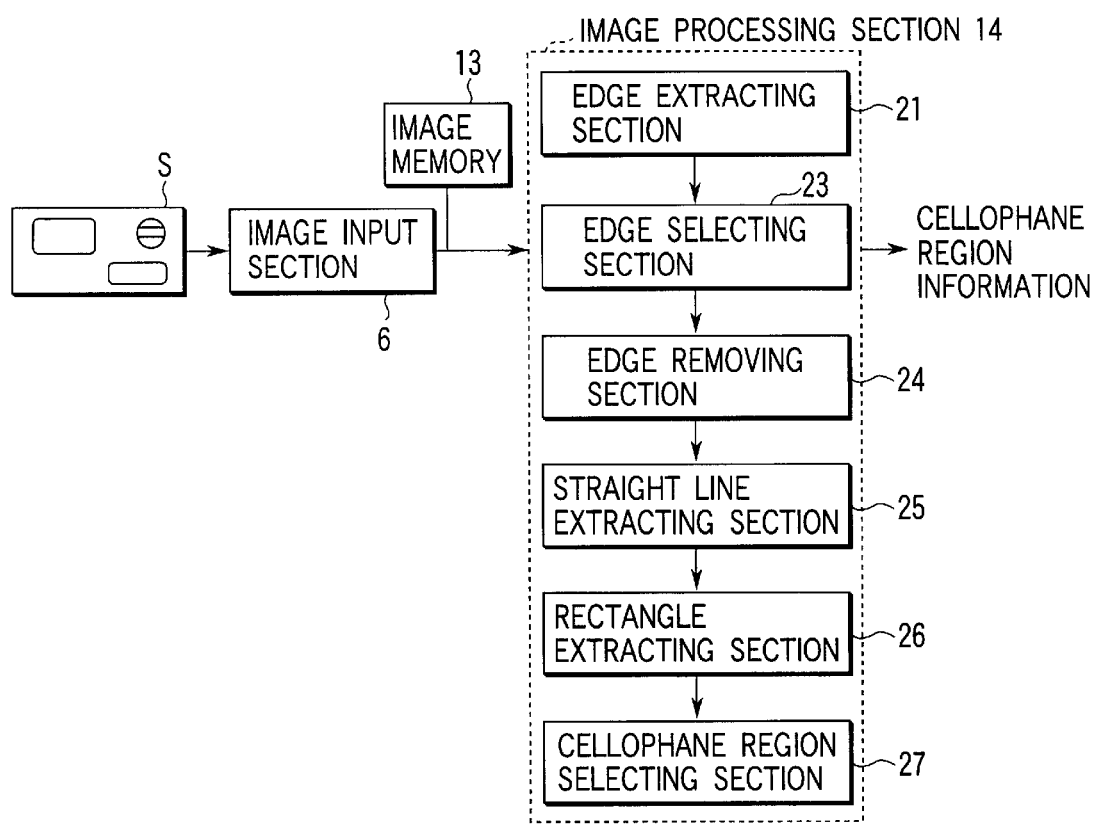
FIG. 23 is a diagram showing the schematic construction of image processing section according to a seventh embodiment of this invention.

The flow of the process by the cellophane region selecting section 27 in the image processing section 14 of the sixth embodiment is explained with reference to an example of paper-like material form information (envelope form information) shown in FIG. 21 and the flowchart shown in FIG. 22.

The cellophane region selecting section 27 holds coordinate information (paper-like material form information) of a cellophane region previously input as shown in FIG. 21 (by use of a main body control section 12). The information contains paper-like material form information of the coordinate, size and form (address frame, addresser frame or the like) of the respective regions for each specified paper-like material form. The region coordinate information in the paper-like material form information is compared with coordinate information of an extracted region, and since the present paper-like material can be determined to have the corresponding paper-like material form if they are sufficiently similar to each other, address frame coordinate information contained in the paper-like material form information is output. In this case, even in a paper-like material in which the address frame (cellophane region) is not clear and is difficult to be extracted and only the addresser frame is extracted, there is no chance of erroneously selecting the addresser frame since only an address frame is output based on the matched paper-like material form information.

That is, next extraction region information is acquired (ST61), paper-like material form information is acquired (ST62) and whether or not the coordinate and size of the region are sufficiently close to those of the cellophane region is determined (ST63). As the result of determination, if it is determined that the coordinate and size of the region are sufficiently close to those of the cellophane region, the coordinate of the address frame contained in the paper-like material form information is output as the cellophane region (ST64).

After this, whether or not the whole paper-like material form information has been processed is determined (ST65), and if the above process is not terminated, the process returns to the step ST63, and if the above process is terminated, the process is terminated.

Next, a seventh embodiment is explained in detail.

The seventh embodiment is obtained by additionally and sequentially connecting edge selecting section 23, edge removing section 24, straight line extracting section 25, rectangle extracting section 26 and cellophane region selecting section 27 to the succeeding stage of the edge extracting section 21 of the image processing section 14 of the first embodiment.

The processes of the individual section are described in the above embodiments. By combining the above section, edge components are extracted based on a differential image, the edge components are selected or removed based on whether they look like part of a cellophane frame or not and then they are merged as a straight line while cut-off portions are permitted. A rectangle is extracted by searching for a combination of straight lines constructing a rectangle based on the thus merged straight lines, the size and position thereof are checked and then the rectangle is output as a cellophane region.

Thus, only a cellophane region within which a destination address is written can be extracted without erroneously detecting a printing frame or addresser frame.

According to the above embodiments, it is not necessary to use an optical system for detecting the cellophane frame. Further, in a case wherein substantially no difference in the density is observed between the surface of the envelope and a portion within the frame as in the cellophane frame, the region can be correctly extracted and the embodiments can be used for destination address recognition. Further, a printed address frame can be prevented from being erroneously extracted.

In the above embodiments, a case wherein a cellophane region of a paper-like material in which an address is written as sorting information is explained, but this is not limitative. For example, in a case wherein a label region of a paper-like material in which an address is written as sorting information is extracted, the same process can be effected.

Particularly, the embodiments are effective when the color of the label and the color of the paper-like material (surface of the envelope) on which the label is attached are similar to each other.

Further, the label region extracting section described above can be used in a case where the label recognition cannot be successfully effected when the label extracting and recognizing process is effected by use of a general method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recognition apparatus for recognizing sorting information as a character string written within one of a cellophane region and label region of a paper-like material, comprising:

reading means for reading a density value of each pixel in a main scanning direction and sub-scanning direction of the paper-like material;

first determining means for determining a portion in which a variation in the density value exceeds a preset value based on the density value of each pixel read by said reading means;

second determining means for determining said one of the cellophane region and label region of the paper-like material based on the portion which is determined by said first determining means that a variation in the density value exceeds the preset value; and recognizing means for recognizing the sorting information based on the character string written within said one of the cellophane region and label region determined by said second determining means, wherein said first determining means includes differentiating means for differentiating the density value of each pixel read by said reading means, first extracting means for extracting edge components of one image based on a differential signal of one image obtained by said differentiating means, and second extracting means for extracting horizontal and vertical projection images for the edge components of one image extracted by said first extracting means, and wherein said second determining means determines a region in which the edge components are concentrated as said one of the cellophane region and label region based on the horizontal and vertical projection images extracted by said second extracting means.

2. The recognition apparatus according to claim 1, wherein said second extracting means includes first take-out means for taking out those of the edge components of one image extracted by said first extracting means whose values are set within a preset range, and third extracting means for extracting horizontal and vertical projection images for the edge components taken out by said first take-out means.

3. The recognition apparatus according to claim 1, wherein said second extracting means includes first removing means for removing those of the edge components of one image extracted by said first extracting means whose values exceed a preset value, and fourth extracting means for extracting horizontal and vertical projection images for edge components which have not been removed by said removing means and are extracted by said first extracting means.

4. The recognition apparatus according to claim 1, wherein said second extracting means includes second take-out means for taking out the edge components of one image extracted by said first extracting means, second removing means for removing double-edge components among the edge components taken out by said second take-out means, and fifth extracting means for extracting horizontal and vertical projection images for the edge components which have not been removed by said second removing means and are taken out by said second take-out means.

5. The recognition apparatus according to claim 1, wherein said second extracting means includes sixth extracting means for extracting straight line portions of the edge components according to the presence or absence of edge components of adjacent and surrounding pixels with respect to the respective pixels of the edge components of one image extracted by said first extracting means, and seventh extracting means for extracting horizontal and vertical projection images for the edge components of the straight line portions extracted by said sixth extracting means.

6. The recognition apparatus according to claim 5, wherein said seventh extracting means extracts a rectangular region as said one of the cellophane region and label region based on the edge components of the straight line portions extracted by said sixth extracting means.

7. The recognition apparatus according to claim 1, wherein said second extracting means includes third determining means for determining at least one region in which the edge components are concentrated as said one of the cellophane region and label region based on the horizontal and vertical projection images extracted by said second extracting means, and selecting means for selecting one of a plurality of regions based on at least one the position and size of each of the regions when said third determining means determines the plurality of regions as said one of the cellophane region and label region.

8. A paper-like material processing apparatus using the recognition apparatus according to claim 1, comprising:

sorting means for sorting the paper-like material based on sorting information recognized by said recognizing means of the recognition apparatus.

9. A recognition method for recognizing sorting information as a character string written within one of a cellophane region and label region of a paper-like material, comprising:

a reading step of reading a density value of each pixel in a main scanning direction and sub-scanning direction of the paper-like material;

a first determining step of determining a portion in which a variation in the density value exceeds a preset value based on the density value of each pixel read in said reading step;

a second determining step of determining said one of the cellophane region and label region of the paper-like material based on the portion which is determined in said first determining step that a variation in the density value exceeds the preset value; and a recognizing step of recognizing the sorting information based on the character string written within said one of the cellophane region and label region determined in said second determining step;

wherein said first determining step includes a differentiating step of differentiating the density value of each pixel read in said reading step, a first extracting step of extracting edge components of one image based on a differential signal of one image obtained in said differentiating steps and a second extracting step of extracting horizontal and vertical projection images for the edge components of one image extracted in said first extracting step, and wherein said second determining step determines a region in which the edge components are concentrated as said one of the cellophane region and label region based on the horizontal and vertical projection images extracted in said second extracting step.

10. The recognition method according to claim 9, wherein said second extracting step includes a first take-out step of taking out those of the edge components of one image extracted in said first extracting step whose values are set within a preset range, and a third extracting step of extracting horizontal and vertical projection images for the edge components taken out in said first take-out step.

11. The recognition method according to claim 9, wherein said second extracting step includes a first removing step of removing those of the edge components of one image extracted in said first extracting step whose values exceed a preset value, and a fourth extracting step of extracting horizontal and vertical projection images for edge components which have not been removed in said removing step and are extracted in said first extracting step.

12. The recognition method according to claim 9, wherein said second extracting step includes a second take-out step of taking out the edge components of one image extracted in said first extracting step, a second removing step of removing double-edge components among the edge components taken out in said second take-out step, and a fifth extracting step of extracting horizontal and vertical projection images for the edge components which have not been removed in said second removing step and are taken out in said second take-out step.

13. The recognition method according to claim 9, wherein said second extracting step includes a sixth extracting step of extracting straight line portions of the edge components according to the presence or absence of edge components of adjacent and surrounding pixels with respect to the respective pixels of the edge components of one image extracted in said first extracting step, and a seventh extracting step of extracting horizontal and vertical projection images for the edge components of the straight line portions extracted in said sixth extracting step.

14. The recognition method according to claim 13, wherein said seventh extracting step extracts a rectangular region as said one of the cellophane region and label region based on the edge components of the straight line portions extracted in said sixth extracting step.

15. The recognition method according to claim 9, wherein said second extracting step includes a third determining step of determining at least one region in which the edge components are concentrated as said one of the cellophane region and label region based on the horizontal and vertical projection images extracted in said second extracting step, and a selecting step of selecting one of a plurality of regions based on at least one of the position and size of each of the regions when the plurality of regions are determined as said one of the cellophane region and label region in said third determining step.

16. A paper-like material processing method using the recognition method according to claim 9, comprising:

a sorting step of sorting the paper-like material based on sorting information recognized by said recognizing step of the recognition method.

17. A recognition apparatus for recognizing sorting information as a character string written within one of a cellophane region and label region of a paper-like material, comprising:

a reading portion which reads a density value of each pixel in a main scanning direction and sub-scanning direction of the paper-like material;

a density-variation determining portion which determines a portion in which a variation in the density value exceeds a preset value based on the density value of each pixel read by said reading portion;

a region determining portion which determines said one of the cellophane region and label region of the paper-like material based on the portion which is determined by said density-variation determining portion that a variation in the density value exceeds the preset value; and a recognizing portion which recognizes the sorting information based on the character string written within said one of the cellophane region and label region determined by said region determining portion;

wherein said density-variation determining section includes a differentiating portion which differentiates the density value of each pixel read by said reading portion, a edge extracting portion which extracts edge components of one image based on a differential signal of one image obtained by said differentiating portion, and a edge-projection extracting portion which extracts horizontal and vertical projection images for the edge components of one image extracted by said edge extracting portion; and wherein said region determining portion determines a region in which the edge components are concentrated as said one of the cellophane region and label region based on the horizontal and vertical projection images extracted by said edge-projection extracting portion.

* * * * *